United States Patent
Tanaka et al.

(10) Patent No.: US 10,017,213 B2
(45) Date of Patent: Jul. 10, 2018

(54) VEHICLE PANEL STRUCTURE AND MANUFACTURING METHOD OF VEHICLE PANEL STRUCTURE

(71) Applicant: TOYOTA JIDOSHA KABUSHIKI KAISHA, Toyota-shi, Aichi-ken (JP)

(72) Inventors: Yoshinori Tanaka, Okazaki (JP); Yoshitsugu Mukaiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 14/935,132

(22) Filed: Nov. 6, 2015

(65) Prior Publication Data
US 2016/0229464 A1 Aug. 11, 2016

(30) Foreign Application Priority Data
Feb. 5, 2015 (JP) .................................. 2015-021307

(51) Int. Cl.
*B62D 29/00* (2006.01)
*B62D 25/10* (2006.01)

(52) U.S. Cl.
CPC ......... *B62D 29/005* (2013.01); *B62D 25/105* (2013.01)

(58) Field of Classification Search
CPC ...... B62D 25/10; B62D 25/102; B62D 25/12; B62D 29/001; B62D 29/005; B62D 25/105

See application file for complete search history.

(56) References Cited

U.S. PATENT DOCUMENTS

| | | | |
|---|---|---|---|
| 4,711,052 A | 12/1987 | Maeda et al. | |
| 5,682,667 A * | 11/1997 | Flagg | B62D 25/105 180/69.2 |
| 6,079,766 A * | 6/2000 | Butler | B60J 5/0441 296/146.5 |
| 6,398,286 B1 * | 6/2002 | Devin | B62D 25/105 180/69.2 |
| 6,626,256 B2 * | 9/2003 | Dennison | B62D 25/10 180/69.24 |
| 6,786,531 B2 * | 9/2004 | Miyahara | B62D 25/105 296/146.1 |
| 6,824,202 B2 * | 11/2004 | Vismara | B60R 21/34 180/69.2 |
| 6,871,903 B2 * | 3/2005 | Taguchi | B61D 17/08 105/396 |

(Continued)

FOREIGN PATENT DOCUMENTS

| | | | | |
|---|---|---|---|---|
| DE | 4019121 A1 * | 1/1991 | ......... | B60R 13/0838 |
| DE | 102006033751 A1 * | 1/2008 | ........... | B62D 25/105 |

(Continued)

*Primary Examiner* — Darrell G Dayoan
*Assistant Examiner* — Paul Chenevert
(74) *Attorney, Agent, or Firm* — Oliff PLC (57) ABSTRACT

A vehicle panel structure includes a metal outer panel configuring an outer panel of a vehicle, a metal reinforcing member that is disposed at an end portion of the outer panel and that is joined to the outer panel further toward an inner side of the vehicle than the outer panel, and a resin inner panel that is disposed further toward the inner side of the vehicle than the reinforcing member and that is joined to the reinforcing member so as to form a closed cross-section between the inner panel and the reinforcing member.

4 Claims, 6 Drawing Sheets

(56) References Cited

U.S. PATENT DOCUMENTS

| | | | | |
|---|---|---|---|---|
| 7,055,894 B2* | 6/2006 | Ikeda | | B60R 21/34 296/187.09 |
| 7,296,845 B2* | 11/2007 | Seksaria | | B62D 25/105 180/69.21 |
| 7,819,453 B2* | 10/2010 | Edwards | | B60R 5/04 220/810 |
| 7,934,354 B2* | 5/2011 | Uto | | B60J 5/045 114/117 |
| 8,075,048 B2* | 12/2011 | Kimoto | | B60R 21/34 180/274 |
| 8,118,352 B2* | 2/2012 | Rocheblave | | B60R 21/34 296/187.04 |
| 8,186,131 B2* | 5/2012 | Uto | | B62D 25/10 114/117 |
| 8,403,405 B2* | 3/2013 | Ikeda | | B60R 21/34 296/187.04 |
| 8,632,118 B2* | 1/2014 | Song | | B21D 39/021 156/216 |
| 8,894,128 B2* | 11/2014 | Barral | | B60J 5/107 296/146.6 |
| 9,027,987 B2* | 5/2015 | Ikeda | | B62D 25/12 296/193.11 |
| 9,150,256 B2* | 10/2015 | Yonezawa | | B60R 21/34 |
| 9,376,145 B2* | 6/2016 | Yoshida | | B62D 25/105 |
| 9,688,313 B2* | 6/2017 | Chikada | | B62D 25/12 |
| 2004/0021342 A1* | 2/2004 | Fujimoto | | B60R 21/34 296/193.11 |
| 2004/0108744 A1* | 6/2004 | Scheib | | B62D 25/142 296/70 |
| 2005/0146162 A1* | 7/2005 | Gerick | | B62D 23/005 296/203.01 |
| 2006/0163915 A1* | 7/2006 | Ikeda | | B60R 21/34 296/193.11 |
| 2007/0236049 A1* | 10/2007 | Chapman | | B62D 25/087 296/193.08 |
| 2008/0238136 A1 | 10/2008 | Fuetterer | | |
| 2010/0072785 A1* | 3/2010 | Wang | | B62D 25/105 296/193.11 |
| 2012/0298436 A1* | 11/2012 | Ho | | B62D 29/005 180/69.2 |
| 2015/0360729 A1* | 12/2015 | Chikada | | B62D 25/105 296/187.09 |
| 2015/0375796 A1* | 12/2015 | Minei | | B62D 27/026 296/29 |
| 2016/0083019 A1* | 3/2016 | Takada | | B60R 21/34 296/193.11 |
| 2016/0144898 A1* | 5/2016 | Fujii | | B62D 25/105 296/191 |
| 2016/0152280 A1* | 6/2016 | Inoue | | B62D 25/105 296/193.11 |
| 2017/0174058 A1* | 6/2017 | Miyake | | B60J 5/107 |

FOREIGN PATENT DOCUMENTS

| | | | | |
|---|---|---|---|---|
| DE | 102009021858 A1 * | 12/2009 | | B62D 25/105 |
| DE | 102009035774 A1 * | 4/2010 | | B60R 21/34 |
| DE | 102009036256 A1 * | 4/2010 | | B62D 25/10 |
| DE | 102009052152 A1 * | 5/2011 | | B62D 25/105 |
| DE | 102010025877 A1 * | 1/2012 | | B60R 21/34 |
| DE | 102012000458 A1 * | 9/2012 | | B62D 25/06 |
| DE | 102013012519 * | 3/2014 | | B62D 25/105 |
| DE | 202015103531 U1 * | 8/2015 | | B62D 25/10 |
| EP | 1504985 A1 * | 2/2005 | | B60R 13/0838 |
| FR | 2941668 A1 * | 8/2010 | | B62D 25/105 |
| GB | 729772 A * | 5/1955 | | B60J 5/00 |
| JP | S62-134327 A | 6/1987 | | |
| JP | H03-057181 A | 3/1991 | | |
| JP | H07-037747 U | 7/1995 | | |
| JP | 2008-505804 A | 2/2008 | | |
| JP | 2008-184104 A | 8/2008 | | |
| JP | 2009-178750 A | 8/2009 | | |
| WO | WO 2011085756 A1 * | 7/2011 | | B60R 21/34 |
| WO | WO 2015098652 A1 * | 7/2015 | | B60K 1/04 |

* cited by examiner

FIG.5
COMPARATIVE EXAMPLE

FIG.6
COMPARATIVE EXAMPLE

VEHICLE PANEL STRUCTURE AND MANUFACTURING METHOD OF VEHICLE PANEL STRUCTURE

CROSS-REFERENCE TO RELATED APPLICATION

This application claims priority under 35 USC 119 from Japanese Patent Application, No. 2015-021307 filed Feb. 5, 2015, the disclosure of which is incorporated by reference herein.

BACKGROUND OF THE INVENTION

Technical Field

The present invention relates to a vehicle panel structure and a manufacturing method of the vehicle panel structure.

Related Art

Japanese Patent Application Laid-Open (JP-A) No. 2009-178750 describes a vehicle panel structure including a metal outer panel configuring an outer panel of a vehicle, and an inner panel joined to the vehicle inside of the outer panel. The outer panel and the inner panel are formed of different types of material. Structures in which the inner panel is formed of a resin material in order to lighten the weight of the vehicle are known as such vehicle panel structures.

SUMMARY

However, since the metal outer panel and the resin inner panel have different thermal expansion coefficients, heat strain sometimes occurs at a joint portion between the outer panel and the inner panel due to the effect of heat during an electro-deposition coating. There are methods of joining the inner panel after painting only the outer panel in order to suppress this heat strain. However, sometimes the required rigidity for transportation between processes cannot be secured by the outer panel alone. In some configurations, the outer panel and the inner panel are coupled together by a metal reinforcing member. In these configurations, the rigidity of the outer panel can be increased by the reinforcing member; however, there is further room for improvement from the perspective of improving the strength of a panel end portion.

In consideration of the above circumstances, an object of the present invention is to obtain a vehicle panel structure and a joining method of the vehicle panel structure capable of securing the required rigidity for transportation between processes and improving the strength of a panel end portion, while well maintaining a joint state between an inner panel and an outer panel, in a vehicle panel structure including a metal outer panel and a resin inner panel.

Solution to Problem

A vehicle panel structure of a first aspect includes a metal outer panel that configures an outer panel of a vehicle, a metal reinforcing member that is disposed at an end portion of the outer panel and that is joined to the outer panel further toward an inner side of the vehicle than the outer panel, and a resin inner panel that is disposed further toward an inner side of the vehicle than the reinforcing member and that is joined to the reinforcing member so as to form a closed cross-section between the inner panel and the reinforcing member.

In the vehicle panel structure of the first aspect, the metal reinforcing member is disposed at the end portion of the metal outer panel configuring an outer panel of the vehicle. The reinforcing member is joined to the outer panel further toward an inner side of the vehicle than the outer panel. This enables the rigidity of the end portion of the outer panel to be improved, and enables the rigidity required for transportation between processes to be secured. This enables electro-deposition coating to be performed in a state in which the outer panel and the reinforcing member are joined together, and the inner panel to be joined afterward, thereby enabling heat strain to be suppressed from occurring at a joint portion between the outer panel and the inner panel. Namely, this enables the joint state between the outer panel and the inner panel to be well maintained.

The resin inner panel is disposed further toward an inner side of the vehicle than the reinforcing member and is joined together with the reinforcing member. The closed cross-section is formed between the inner panel and the reinforcing member. This enables the strength of the panel end portion to be improved.

A vehicle panel structure of a second aspect is the first aspect, wherein the inner panel includes a sealing portion that seals between the inner panel and a vehicle main body.

In the vehicle panel structure of the second aspect, the inner panel includes the sealing portion that seals between the inner panel and the vehicle main body. Note that a resin material has more degrees of freedom for molding than a metal material. Thus, by forming the sealing portion to the resin inner panel, the degrees of freedom for molding the sealing portion can be increased compared to cases in which a sealing portion is formed of a metal material.

A vehicle panel structure of a third aspect is the first aspect or the second aspect, wherein the inner panel is formed with a first attachment hole for assembly to a vehicle main body, and the reinforcing member is formed with a second attachment hole that is in communication with the first attachment hole in a state in which the reinforcing member is assembled to the vehicle main body.

The vehicle panel structure of the third aspect enables the reinforcing member to be assembled to the vehicle main body using the second attachment hole after the outer panel and the reinforcing member have been joined together. This enables the outer panel and the reinforcing member to be assembled to the vehicle main body and assembly-line electro-deposition coating to be performed in a state prior to joining the inner panel, without employing a dedicated jig. Moreover, when assembling the inner panel and the reinforcing member, in a joint state together with the outer panel, to the vehicle main body, a fastening member such as a bolt is inserted through the first attachment hole and the second attachment hole and fastens together the inner panel and the reinforcing member, thereby enabling the assembly strength (attachment strength) to be improved.

A vehicle panel structure of a fourth aspect is any one of the first aspect to the third aspect, wherein the reinforcing member is formed in a ring shape along an outer peripheral end portion of the outer panel.

In the vehicle panel structure of the fourth aspect, forming the reinforcing member in a ring shape enables the rigidity of the end portion of the outer panel to be improved around the entire periphery.

A method of manufacturing a vehicle panel structure of a fifth aspect, the method includes: disposing a reinforcing member along an end portion of a metal outer panel configuring an outer panel of a vehicle and further toward an inner side of the vehicle than the outer panel, and joining the outer panel and the reinforcing member together by hemming; assembling the hemmed outer panel and reinforcing member to a vehicle main body, and performing assembly-line electro-deposition coating; and removing the outer panel and the reinforcing member from the vehicle main body after the electro-deposition coating, and joining a resin inner panel to a vehicle inner side of the reinforcing member.

In the method of manufacturing the vehicle panel structure of the fifth aspect, the reinforcing member is joined to the end portion of the outer panel by hemming. The outer panel and the reinforcing member are assembled to the vehicle main body and assembly-line electro-deposition coating is performed. Thus transportation between processes is performed in a state in which the reinforcing member is joined to the outer panel, thereby enabling the rigidity required for transportation between processes to be secured, even in the state prior to joining the inner panel.

The inner panel is joined to the reinforcing member that has been removed from the vehicle main body after the electro-deposition coating. This enables electro-deposition coating of the resin inner panel, which has a poorer electro-deposition coating quality than a metal material, to be avoided, thereby enabling a negative effect on styling to be suppressed.

Advantageous Effects of Invention

As explained above, the vehicle panel structure and the manufacturing method of the vehicle panel structure according to the present invention has excellent advantageous effects of enabling the required rigidity for transportation between processes to be secured and the strength of the panel end portion to be improved, while favorably maintaining the joint state between the inner panel and the outer panel, in the vehicle panel structure including the metal outer panel and the resin inner panel.

BRIEF DESCRIPTION OF THE DRAWINGS

Embodiments of the present invention will be described in detail based on the following figures, wherein.

DETAILED DESCRIPTION OF THE INVENTION

First Exemplary Embodiment

Explanation follows regarding a vehicle panel structure according to a first exemplary embodiment, based on the drawings. Note that in the drawings, the arrow FR indicates the vehicle front side, the arrow UP indicates the vehicle upper side, and the arrow RH indicates the vehicle right side as appropriate, in a vehicle applied with the vehicle panel structure of the present exemplary embodiment. In the below explanation, unless specifically stated otherwise, reference to the front-rear, up-down, and left-right directions refers to front-rear in the vehicle front-rear direction, up-down in the vehicle up-down direction, and left-right in the vehicle left-right direction (vehicle width direction).

Configuration of Vehicle Panel Structure

Figure 1:
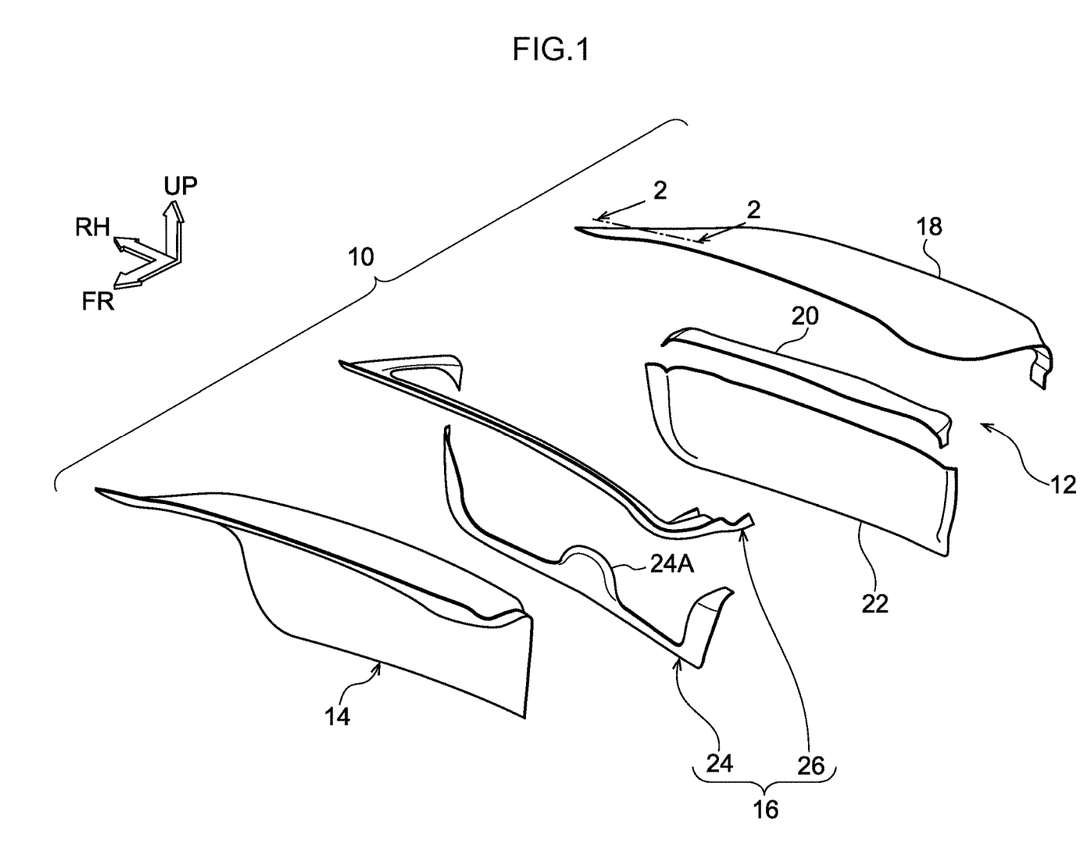
FIG. 1 is an exploded perspective view illustrating a vehicle panel structure according to a first exemplary embodiment.

As illustrated in FIG. 1, the present exemplary embodiment describes an example in which the vehicle panel structure according to the present invention is applied to a luggage door 10. The luggage door 10 is mainly configured including an outer panel 12, an inner panel 14, and ring-shaped reinforcement 16 serving as a reinforcing member.

The outer panel 12 is a metal panel member configuring an outer panel of the vehicle, and is formed of aluminum (or aluminum alloy) in the present exemplary embodiment as an example. The outer panel 12 includes three members, these being an outer side lateral wall member 18, an outer side upright wall member 22, and a coupling member 20. The outer side lateral wall member 18 is disposed with its plate thickness direction along the vehicle up-down direction. The outer side upright wall member 22 is disposed at the vehicle lower side of a rear end portion of the outer side lateral wall member 18 with its plate thickness direction along the vehicle front-rear direction. The coupling member 20 is an elongated shaped member disposed between the outer side lateral wall member 18 and the outer side upright wall member 22. The outer panel 12 is formed by joining these members together.

The inner panel 14 is a resin panel member disposed further to the vehicle inside than the outer panel 12, and is formed of a carbon fiber reinforced plastic (CPRP) material in the present exemplary embodiment as an example. The inner panel 14 includes a location extending along the vehicle front-rear direction with its plate thickness direction along the vehicle up-down direction, and a location extending along the vehicle up-down direction with its plate thickness direction along the vehicle front-rear direction, and is configured with a substantially L-shaped cross-section viewed along the vehicle width direction, so as to correspond to the outer panel 12. The inner panel 14 is unpainted, and is assembled in an unpainted state.

The ring-shaped reinforcement 16 is disposed between the outer panel 12 and the inner panel 14. The ring-shaped reinforcement 16 is a metal member formed in a ring shape running along an outer peripheral end portion of the outer panel 12, and is formed of aluminum (or aluminum alloy) in the present exemplary embodiment as an example. The ring-shaped reinforcement 16 is configured including an upper side member 26 and a lower side member 24.

The upper side member 26 is formed in a substantially U-shape open at the vehicle rear side in plan view, and configured disposed between the outer side lateral wall member 18 and the inner panel 14 so as to couple both members together. The lower side member 24 is formed in a substantially U-shape open at the vehicle upper side in a front view viewed from the vehicle front, and is configured disposed between the outer side upright wall member 22 and the inner panel 14 so as to couple both members together. A vehicle width direction intermediate portion of the lower side member 24 is provided with a protruding portion 24A protruding out toward the vehicle upper side, and a lock mechanism or the like, not illustrated in the drawings, for locking the luggage door 10 to the vehicle main body, is attached to the protruding portion 24A.

Figure 2:
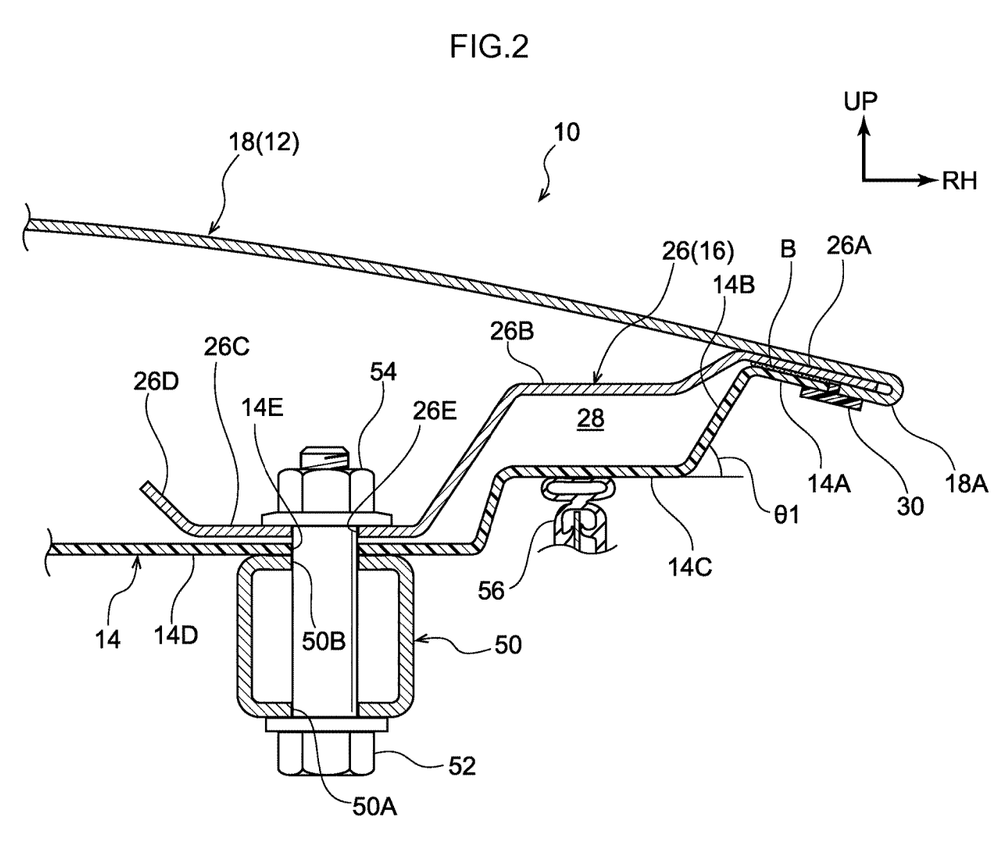
FIG. 2 is a cross-section sectioned along line 2-2 in FIG. 1.

As illustrated in FIG. 2, a vehicle width direction outside end portion of the outer side lateral wall member 18 of the outer panel 12 curves gently toward the vehicle lower side on progression toward the vehicle width direction outside. An outer edge of the outer side lateral wall member 18 is folded back toward the vehicle lower side and hemmed, and an outside flange 26A of the upper side member 26 of the ring-shaped reinforcement 16 is wedged into a hemmed portion 18A. Namely, the outer side lateral wall member 18 (outer panel 12) and the upper side member 26 of the ring-shaped reinforcement 16 are joined together by hemming at the hemmed portion 18A. Although not illustrated in the drawings, a similar hemmed portion is also formed to an outer peripheral end portion of the outer side upright wall member 22, and the outer side upright wall member 22 and the lower side member 24 are joined together by hemming at this hemmed portion (see FIG. 1).

The upper side member 26 of the ring-shaped reinforcement 16 slopes gently toward the vehicle lower side on progression from the outside flange 26A positioned at the hemmed portion 18A toward the vehicle width direction inside, and a first horizontal portion 26B extends substantially horizontally from a lower end of the sloped portion toward the vehicle width direction inside. A sloped portion slopes toward the vehicle lower side on progression from a vehicle width direction inside end portion of the first horizontal portion 26B toward the vehicle width direction inside, and a second horizontal portion 26C extends substantially horizontally from a lower end of this sloped portion toward the vehicle width direction inside. A vehicle width direction inside end portion of the second horizontal portion 26C is bent toward the vehicle upper side to form an inside flange 26D.

Note that an attachment hole 26E (second attachment hole) is formed in the second horizontal portion 26C, and a bolt 52 for attaching to a hinge 50 is inserted through the attachment hole 26E. A nut 54 formed in a shape concentric to the attachment hole 26E is provided at an upper face of the second horizontal portion 26C.

The inner panel 14 that is disposed further to the vehicle inside than the upper side member 26 is formed in a shape corresponding to the upper side member 26, and a joint portion 14A at a vehicle width direction outside end portion of the inner panel 14 is adhered (joined) to a lower face of the outside flange 26A of the upper side member 26 by adhesive B. A vehicle width direction outside end face of the joint portion 14A is disposed so as to face an end face of the hemmed portion 18A of the outer panel 12 with an interval along the vehicle width direction therebetween. This interval is then closed off by a sealer 30, this being a sealing member.

A sloped portion 14B is provided sloping toward the vehicle lower side on progression from a vehicle width direction inside end portion of the joint portion 14A toward the vehicle width direction inside, and a first horizontal portion 14C extends substantially horizontally from a lower end of the sloped portion 14B toward the vehicle width direction inside. Note that a closed cross-section 28 is formed between the first horizontal portion 26B of the upper side member 26 (ring-shaped reinforcement 16) and the first horizontal portion 14C of the inner panel 14. A weather strip 56 at the vehicle main body side press-contacts a lower face of the first horizontal portion 14C, and is configured so as to enable sealing between the vehicle main body and the luggage door 10. Namely, the first horizontal portion 14C configures a sealing portion that seals between the luggage door 10 and the vehicle main body.

A sloped portion slopes toward the vehicle lower side on progression from a vehicle width direction inside end portion of the first horizontal portion 14C toward the vehicle width direction inside, and a second horizontal portion 14D extends substantially horizontally from a lower end of this sloped portion toward the vehicle width direction inside. Note that an attachment hole 14E (first attachment hole) is formed in the second horizontal portion 14D. The attachment hole 14E is formed at a position that is in communication with the attachment hole 26E of the upper side member 26, and the bolt 52 for attaching to the hinge 50 is inserted through the attachment hole 14E.

The hinge 50 is formed with a substantially rectangular tube shaped cross-section, and an insertion hole 50A is formed in a lower face of the hinge 50. An insertion hole 50B is formed in an upper face of the hinge 50 at a position corresponding to the insertion hole 50A, and the bolt 52 is inserted through the insertion hole 50A and the insertion hole 50B. The bolt 52 is screwed onto the nut 54 provided to the upper side member 26, thereby fastening the hinge 50 in a state in which the upper side member 26 and the inner panel 14 are fastened together. The luggage door 10 is assembled to the vehicle main body by the hinge 50. Note that an interior material, not illustrated in the drawings, is attached to an inner face side of the inner panel 14 in this state, such that the unpainted inner panel 14 is not exposed.

Manufacturing Method of Vehicle Panel Structure

Figure 3:
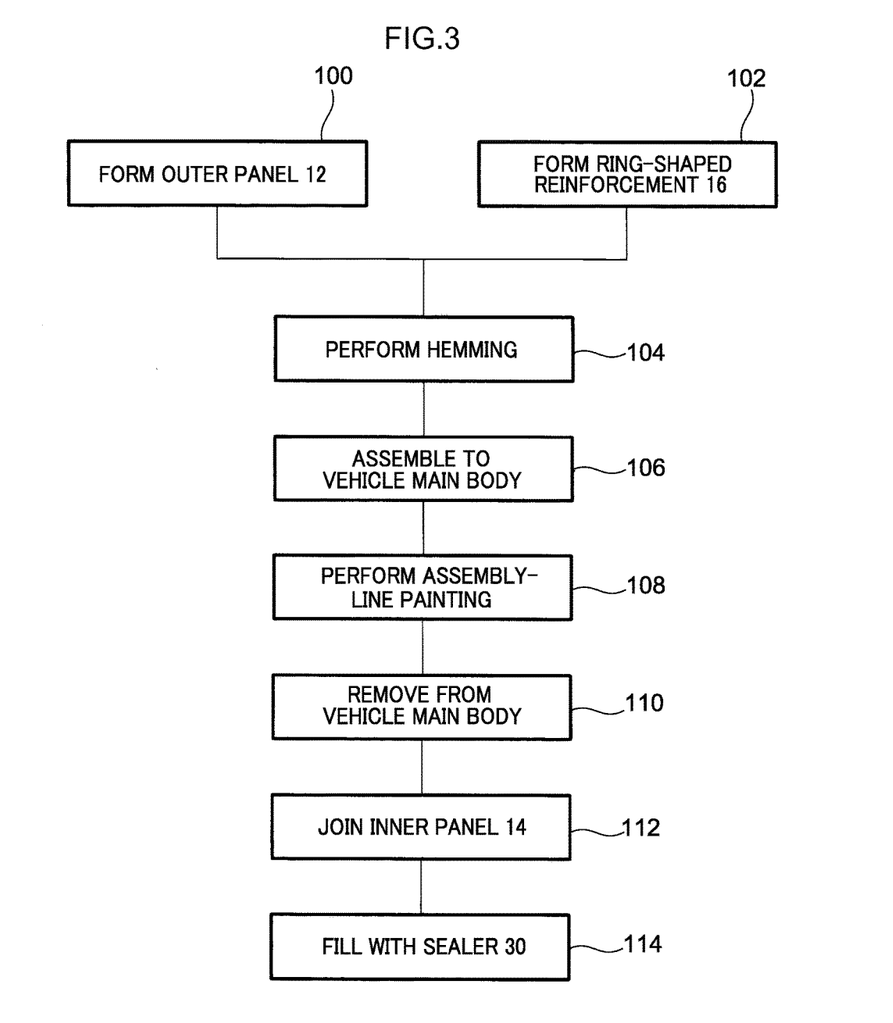
FIG. 3 is a flowchart illustrating an example of a manufacturing method of a vehicle panel structure according to the first exemplary embodiment.

Explanation follows regarding a manufacturing method of the luggage door 10 applied with the vehicle panel structure according to the present invention, with reference to the flowchart in FIG. 3

First, at step 100, as illustrated in FIG. 1, the outer side lateral wall member 18, the outer side upright wall member 22, and the coupling member 20 are joined together to form the outer panel 12. At step 102, the upper side member 26 and the lower side member 24 are joined together to form the ring-shaped reinforcement 16.

Next, at step 104, the ring-shaped reinforcement 16 is disposed along an end portion of the outer panel 12 further to the vehicle inside than the outer panel 12, and the outer panel 12 and the ring-shaped reinforcement 16 are joined together by hemming (a reinforcing member joining process). The outer peripheral end portion of the outer panel 12 is thereby reinforced by the ring-shaped reinforcement 16, enabling rigidity to be improved.

Next, at step 106, the outer panel 12 and the ring-shaped reinforcement 16 are assembled to the vehicle main body. Note that, as illustrated in FIG. 2, in a state in which the attachment hole 26E formed to the second horizontal portion 26C of the upper side member 26 (ring-shaped reinforcement 16) and the insertion hole 50A and the insertion hole 50B of the hinge 50 are aligned with each other, the bolt 52 is inserted through from the lower side of the hinge 50, screwed onto the nut 54, and fixed to the upper side member 26. Note that the inner panel 14 is not attached in this state, such that only the outer panel 12 and the ring-shaped reinforcement 16 are attached to the vehicle main body.

As illustrated in FIG. 3, assembly-line electro-deposition coating is performed at step 108 (an assembly-line electro-deposition coating process). The outer panel 12 is thereby painted together with the vehicle main body. Next, at step 110, the outer panel 12 and the ring-shaped reinforcement 16 are removed from the vehicle main body. Note that the electro-deposition coating process allows the nut 54 to remain fixed to the outer surface of the ring-shaped reinforcement 16 when the bolt 52 is removed so as to further allow the re-insertion of the bolt 52 without access to the nut 54.

Next, at step 112, as illustrated in FIG. 2, the inner panel 14 is joined to the ring-shaped reinforcement 16 using the adhesive B (an inner panel joining process). Finally, at step 114, the interval between the hemmed portion 18A of the outer panel 12 and the inner panel 14 is filled with the sealer 30 and sealed. In the present exemplary embodiment, the luggage door 10 is manufactured in the above manner; however configuration is not limited thereto. In cases in which the outer panel 12 and the ring-shaped reinforcement 16 are integrally formed, for example, step 100 and step 102 are omitted. In cases in which the outer panel 12 and the ring-shaped reinforcement 16 are joined together by a method other than hemming, step 104 may be changed for another process.

Operation and Advantageous Effects

Explanation follows regarding operation and advantageous effects of the vehicle panel structure according to the present exemplary embodiment.

First, explanation follows regarding a luggage door of a Comparative Example 1 and a luggage door of a Comparative Example 2 that are not applied with the vehicle panel structure according to the present invention. Note that similar configuration to the first exemplary embodiment is applied with the same reference numerals, and explanation is omitted as appropriate.

Figure 5:
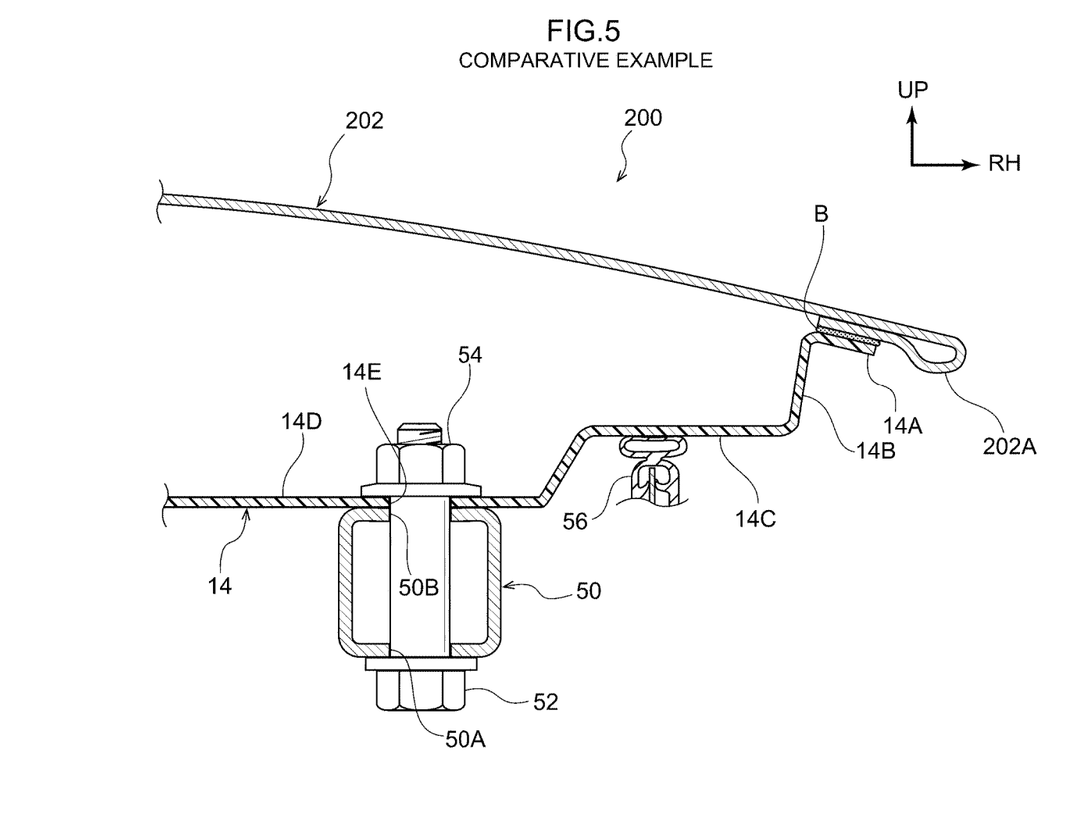
FIG. 5 is a cross-section corresponding to FIG. 2, illustrating a vehicle panel structure of a Comparative Example 1.

As illustrated in FIG. 5, a luggage door 200 of the Comparative Example 1 is not provided with a ring-shaped reinforcement 16. A structure is thereby configured in which a metal outer panel 202 and the resin inner panel 14 are joined together by the adhesive B. Specifically, an end portion of the outer panel 202 is folded back to form a hemmed portion 202A, and the joint portion 14A of the inner panel 14 is adhered (joined) to a vehicle inside face of the hemmed portion 202A by the adhesive B. The bolt 52 that is inserted through the hinge 50 is only inserted through the attachment hole 14E of the inner panel 14 and screwed onto the nut 54.

In the luggage door 200 of the Comparative Example 1 configured as described above, the ring-shaped reinforcement 16 is not provided, such that, unless in a state in which the outer panel 202 and the inner panel 14 are joined together, the required rigidity for transportation between processes cannot be secured. The assembly-line electro-deposition coating is accordingly performed after the outer panel 202 and the inner panel 14 have been joined together, such that heat strain sometimes occurs at a joint portion between the outer panel 202 and the inner panel 14. Even in cases in which rigidity can be secured by making the plate thickness of the outer panel 202 thicker, for example, a dedicated jig needs to be prepared in order to assemble only the outer panel 202 to the vehicle main body and perform assembly-line electro-deposition coating.

Figure 6:
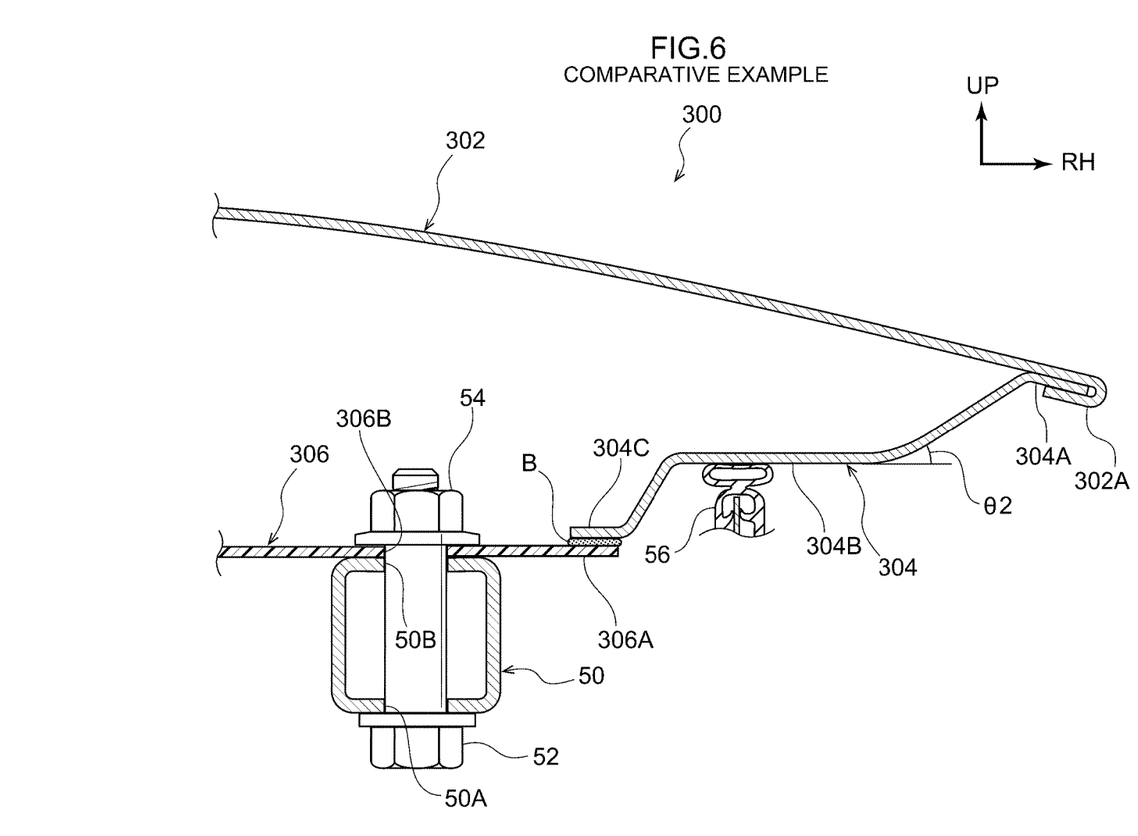
FIG. 6 is a cross-section corresponding to FIG. 2, illustrating a vehicle panel structure of a Comparative Example 2.

As illustrated in FIG. 6, in a luggage door 300 of the Comparative Example 2, an inner panel 306 does not extend as far as a vehicle width direction end portion. A structure is configured in which the inner panel 306 and an outer panel 302 are coupled together along the vehicle width direction by a metal coupling member 304. Specifically, an end portion of the outer panel 302 is folded back to form a hemmed portion 302A, and an outside flange 304A of the coupling member 304 is wedged into and joined to the hemmed portion 302A.

The coupling member 304 extends along the vehicle width direction, and slopes gently toward the vehicle lower side on progression from the outside flange 304A at the vehicle width direction outside toward the vehicle width direction inside. A horizontal portion 304B extends substantially horizontally from a lower end of this sloping location toward the vehicle width direction inside. A sloped portion slopes toward the vehicle lower side on progression from the horizontal portion 304B further toward the vehicle width direction inside, and an inside flange 304C extends substantially horizontally from a lower end of this sloped portion toward the vehicle width direction inside. An outer end portion 306A at the vehicle width direction outside of the inner panel 306 is joined to a lower face of the inside flange 304C by the adhesive B.

The inner panel 306 extends in a substantially straight line shape along the vehicle width direction, and an attachment hole 306B is formed in the inner panel 306. The bolt 52 is inserted through the insertion hole 50A and the insertion hole 50B of the hinge 50, and through the attachment hole 306B, and screwed onto the nut 54.

In the luggage door 300 of the Comparative Example 2 configured as described above, joining the coupling member 304 to the outer panel 302 enables the rigidity to be improved. However, in a state prior to joining the inner panel 306, a dedicated jig needs to be prepared in order to assemble the outer panel 302 and the coupling member 304 to the vehicle main body when assembling to the vehicle main body to perform assembly-line electro-deposition coating.

In the luggage door 300 of the Comparative Example 2, configuration is such that the weather strip 56 press-contacts the horizontal portion 304B of the coupling member 304 in an assembled state to the vehicle main body. Namely, the horizontal portion 304B of the coupling member 304 forms a sealing portion that seals between the luggage door 300 and the vehicle main body. Note that in the Comparative Example 2, the sealing portion is formed by the metal coupling member 304, such that the degrees of freedom for molding are fewer than in cases in which a sealing portion is formed of resin material. Thus, the angle θ2 of the sloped portion between the outside flange 304A and the horizontal portion 304B cannot be increased, and a luggage opening cannot be enlarged.

The luggage door 10 of the present exemplary embodiment is configured such that the metal ring-shaped reinforcement 16 is disposed along the outer peripheral end portion of the outer panel 12, and the outer panel 12 and the inner panel 14 are coupled together by the ring-shaped reinforcement 16. This enables rigidity to be secured, even in a state prior to joining the inner panel 14, namely, even in the state in which the outer panel 12 and the ring-shaped reinforcement 16 are coupled together. This enables transportation between processes, such as the assembly-line electro-deposition coating process, to be performed in the state prior to attaching the inner panel 14.

In the present exemplary embodiment, the attachment hole 26E is formed to the upper side member 26 of the ring-shaped reinforcement 16, and the bolt 52 is inserted through the attachment hole 26E and screwed onto the nut 54, thereby enabling assembly to the vehicle main body even in the state prior to joining the inner panel 14. There is accordingly no need to prepare a dedicated jig in order to assemble the outer panel 12 to the vehicle main body during assembly-line electro-deposition coating as in the luggage door 300 of the Comparative Example 2.

In the present exemplary embodiment, the ring-shaped reinforcement 16 and the inner panel 14 are fastened together when assembling to the vehicle main body with the inner panel 14 in a joined state. This enables the assembly strength (attachment strength) of the luggage door 10 with respect to the vehicle main body to be improved compared to the luggage door 200 of the Comparative Example 1 and the luggage door 300 of the Comparative Example 2, in which only the inner panel 14 is fastened.

In the vehicle panel structure of the present exemplary embodiment, the inner panel 14 is joined after the outer panel 12 has been painted, thereby enabling heat strain to be suppressed from occurring at the joint portion between the outer panel 12 and the inner panel 14. Namely, when electro-deposition coating is performed in the state in which the metal outer panel 202 and the resin inner panel 14 are joined together as in the luggage door 200 of the Comparative Example 1, the thermal expansion coefficients of the outer panel 202 and the inner panel 14 are different from each other, such that heat strain sometimes occurs at the joint portion. In contrast thereto, by joining the resin inner panel 14 after electro-deposition coating as in the present exemplary embodiment, heat strain can be suppressed from occurring at the joint portion, and the joined state of the outer panel 12 and the inner panel 14 can be well maintained.

Moreover, the inner panel 14 that is formed of a carbon fiber reinforced plastic or the like has a poorer electro-deposition coating quality than a metal material, such that when electro-deposition coating is performed with the outer panel 12 and the inner panel 14 in the joined state, a difference in painted state sometimes occurs, with a negative effect on styling. To address this, the inner panel 14 is unpainted in the present exemplary embodiment, thereby enabling a negative effect on the styling to be suppressed.

In the present exemplary embodiment, the closed cross-section 28 is formed by the upper side member 26 of the ring-shaped reinforcement 16, and the inner panel 14, thereby enabling the strength of an outer peripheral end portion of the luggage door 10 to be improved. In particular, in the present exemplary embodiment, the ring-shaped reinforcement 16 is formed in a ring shape along the outer peripheral end portion of the outer panel 12, thereby enabling the strength of the outer peripheral end portion of the luggage door 10 to be improved around the entire periphery.

In the present exemplary embodiment, the sealing portion that seals between the luggage door 10 and the vehicle main body (the first horizontal portion 14C) is formed of a resin material that has more degrees of freedom for molding. This enables the angle θ1 of the sloped portion 14B with respect to the first horizontal portion 14C to be configured larger than the angle θ2 of the sloped portion in the Comparative Example 2 illustrated in FIG. 6. This enables the luggage opening to be enlarged.

Second Exemplary Embodiment

Figure 4:
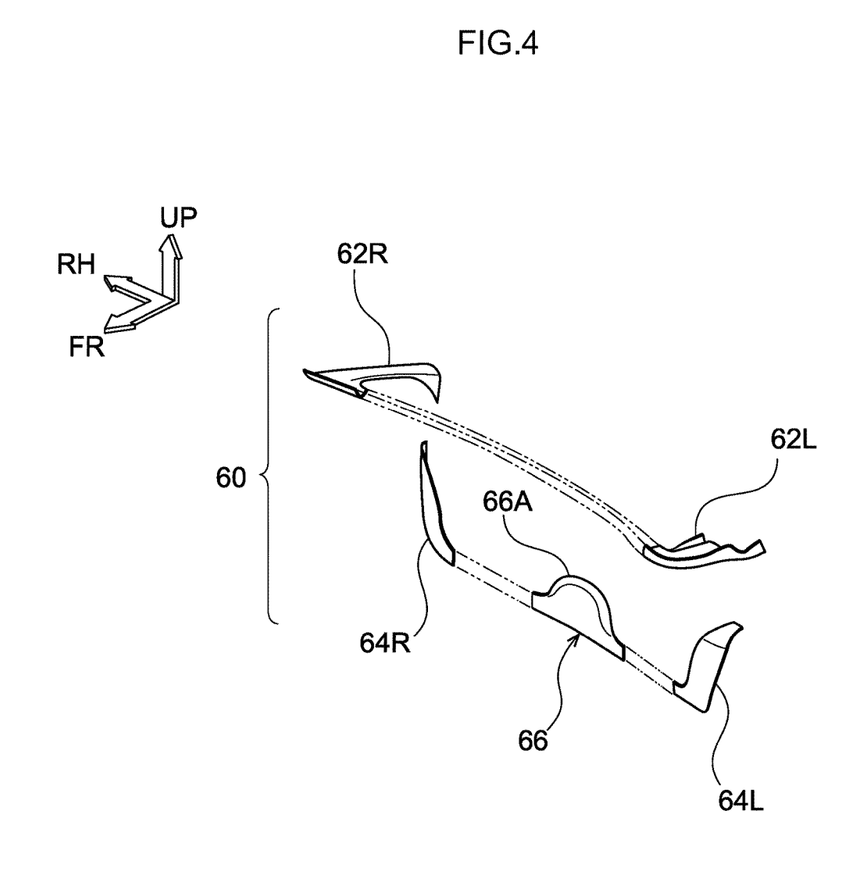
FIG. 4 is a perspective view illustrating divided reinforcement configuring a vehicle panel structure according to a second exemplary embodiment.

Explanation follows regarding a vehicle panel structure according to a second exemplary embodiment. Note that in the second exemplary embodiment, configuration is similar to the first exemplary embodiment except in the respect that divided reinforcement 60 is employed instead of the ring-shaped reinforcement 16, and so explanation follows regarding only the divided reinforcement 60.

As illustrated in FIG. 4, the divided reinforcement 60 serving as a reinforcing member configuring the vehicle panel structure according to the present exemplary embodiment is configured including a pair configured of a right upper side member 62R and a left upper side member 62L, and a pair configured of a right lower side member 64R and a left lower side member 64L.

Note that the upper side member 62R extends in the vehicle front-rear direction along an end portion at the vehicle width direction right side of the outer side lateral wall member 18 configuring the outer panel 12, and the upper side member 62L extends in the vehicle front-rear direction along an end portion at the vehicle width direction left side of the outer side lateral wall member 18. Namely, the shape is such that a location extending along the vehicle width direction (the location illustrated by double-dotted dashed lines in FIG. 4) has been removed from the substantially U-shaped upper side member 26 according to the first exemplary embodiment.

The lower side member 64R extends in the vehicle up-down direction along an end portion at the vehicle width direction right side of the outer side upright wall member 22 configuring the outer panel 12, and the lower side member 64L extends in the vehicle up-down direction along an end portion at the vehicle width direction left side of the outer side upright wall member 22. Namely, the shape is such that a location extending along the vehicle width direction (the location illustrated by double-dotted dashed lines in FIG. 4) has been removed from the substantially U-shaped lower side member 24 according to the first exemplary embodiment.

Lock reinforcement 66, including a protruding portion 66A protruding out toward the vehicle upper side, is provided between the lower side member 64R and the lower side member 64L. A lock mechanism or the like, not illustrated in the drawings, for locking the luggage door to the vehicle main body is attached to the lock reinforcement 66.

When the divided reinforcement 60 is joined to the outer panel 12, first, the upper side member 62R and the lower side member 64R are joined together by welding or the like, and the upper side member 62L and the lower side member 64L are joined together by welding or the like. The respective members are then joined to the outer panel 12. Note that since the lower side member 64R and the lower side member 64L are separated from each other in the lock reinforcement 66, each member may be joined to the outer panel 12 individually.

The vehicle panel structure according to the present exemplary embodiment configured as described above has similar advantageous effects to the first exemplary embodiment.

The first exemplary embodiment and the second exemplary embodiment of the present invention have been explained above; however, the present invention is not limited to these exemplary embodiments, and obviously various modifications may be implemented within a range not departing from the spirit of the present invention. In the above exemplary embodiments, for example, exemplary embodiments have been explained in which the vehicle panel structure according to the present invention has been applied to a luggage door; however, configuration is not limited thereto, and application may be made to a side door or the like.

Moreover, there is no particular limitation to the material or shape of the ring-shaped reinforcement 16, the outer panel 12, and the inner panel 14 in FIG. 1. For example, it suffices that the ring-shaped reinforcement 16 and the outer panel 12 are configured of a metal material, and may be formed of a material other than aluminum. The inner panel 14 may be formed of a resin material other than a carbon fiber reinforced plastic material. Moreover, the outer side lateral wall member 18, the outer side upright wall member 22, and the coupling member 20 may be employed as an integrated outer panel. The upper side member 26 and the lower side member 24 may be employed as integrated ring-shaped reinforcement 16.

What is claimed is:

1. A vehicle panel structure, comprising:
   a metal outer panel that configures an outer panel of a vehicle;
   a metal reinforcing member that is disposed at an end portion of the outer panel and that is joined to the outer panel further toward an inner side of the vehicle than the outer panel, the reinforcing member being formed in a ring shape along an outer peripheral end portion of the outer panel;
   a resin inner panel that is disposed further toward the inner side of the vehicle than the reinforcing member and that is joined to the reinforcing member so as to form a closed cross-section between the resin inner panel and the reinforcing member, wherein
   a vehicle width direction outer end face of the resin inner panel is disposed so as to face a vehicle width direction inner end face of the metal outer panel with an interval therebetween along a vehicle width direction; and
   a sealing member arranged to seal the interval by contacting the vehicle width direction outer end face of the resin inner panel and the vehicle width direction inner end face of the metal outer panel, wherein
   the vehicle width direction outer end face of the resin inner panel is an outermost surface of the resin inner panel, the vehicle width direction inner end face of the metal outer panel is an innermost surface of the metal outer panel, and the interval therebetween is defined by a width of the sealing member.

2. The vehicle panel structure of claim 1, wherein the resin inner panel includes a sealing portion that seals between the resin inner panel and a vehicle main body.

3. The vehicle panel structure of claim 1, wherein
   the resin inner panel is formed with a first attachment hole for assembly to a vehicle main body, and
   the reinforcing member is formed with a second attachment hole that is in communication with the first attachment hole in a state in which the reinforcing member is assembled to the vehicle main body.

4. A method of manufacturing a vehicle panel structure, the method comprising:
   disposing a reinforcing member along an end portion of a metal outer panel configuring an outer panel of a vehicle and further toward an inner side of the vehicle than the outer panel, and joining the outer panel and the reinforcing member together by hemming, the reinforcing member being formed in a ring shape along an outer peripheral end portion of the outer panel;
   assembling the hemmed outer panel and reinforcing member to a vehicle main body, and performing assembly-line electro-deposition coating;
   removing the outer panel and the reinforcing member from the vehicle main body after the electro-deposition coating, and joining a resin inner panel to a vehicle inner side of the reinforcing member, wherein a vehicle width direction outer end face of the resin inner panel is disposed so as to face a vehicle width direction inner end face of the metal outer panel with an interval therebetween along a vehicle width direction; and
   arranging a sealing member to seal the interval by contacting the vehicle width direction outer end face of the resin inner panel and the vehicle width direction inner end face of the metal outer panel, wherein
   the vehicle width direction outer end face of the resin inner panel is an outermost surface of the resin inner panel, the vehicle width direction inner end face of the metal outer panel is an innermost surface of the metal outer panel, and the interval therebetween is defined by a width of the sealing member.

* * * * *